(12) United States Patent
Skidmore et al.

(10) Patent No.: US 10,614,308 B2
(45) Date of Patent: Apr. 7, 2020

(54) AUGMENTATIONS BASED ON POSITIONING ACCURACY OR CONFIDENCE

(71) Applicant: EDX Technologies, Inc., Austin, TX (US)

(72) Inventors: Roger Ray Skidmore, Austin, TX (US); Eric Reifsnider, Raleigh, NC (US)

(*) Notice: Subject to any disclaimer, the term of this patent is extended or adjusted under 35 U.S.C. 154(b) by 0 days.

(21) Appl. No.: 15/992,986

(22) Filed: May 30, 2018

(65) Prior Publication Data

US 2018/0349701 A1    Dec. 6, 2018

Related U.S. Application Data

(60) Provisional application No. 62/512,282, filed on May 30, 2017.

(51) Int. Cl.

| G06T 5/00 | (2006.01) |
|---|---|
| G06K 9/00 | (2006.01) |
| H04W 4/021 | (2018.01) |
| G06T 7/70 | (2017.01) |
| G06F 3/01 | (2006.01) |

(52) U.S. Cl.
CPC ........... *G06K 9/00671* (2013.01); *G06F 3/01* (2013.01); *G06T 5/003* (2013.01); *G06T 7/70* (2017.01); *H04W 4/021* (2013.01)

(58) Field of Classification Search
None
See application file for complete search history.

(56) References Cited

U.S. PATENT DOCUMENTS

| 2005/0215879 A1* | 9/2005 | Chuanggui | G06T 7/001 600/407 |
|---|---|---|---|
| 2006/0167627 A1* | 7/2006 | Dooley | G01C 21/32 345/629 |
| 2012/0105473 A1* | 5/2012 | Bar-Zeev | G02B 27/017 345/633 |
| 2012/0105474 A1* | 5/2012 | Cudalbu | G01C 21/20 345/633 |
| 2013/0174213 A1* | 7/2013 | Liu | G02B 27/017 726/1 |
| 2015/0317832 A1* | 11/2015 | Ebstyne | G06F 3/011 345/633 |
| 2017/0270715 A1* | 9/2017 | Lindsay | G06F 3/011 |
| 2017/0322032 A1* | 11/2017 | Friedler | G01C 21/20 |
| 2018/0005450 A1* | 1/2018 | Daniels | G01S 19/01 |

OTHER PUBLICATIONS

StephaneCote, "Augmetned reality for subsurface utilities : further improving perception", Jun. 18, 2012, URL: https://communities.bentley.com/other/old_site_member_blogs/bentley_employees/b/stephanecotes_blog/posts/augmented-reality-for-subsurface-utilities-further-improving-perception (Year: 2012).*

* cited by examiner

*Primary Examiner* — David H Chu
(74) *Attorney, Agent, or Firm* — W&C IP

(57) ABSTRACT

Augmented reality augmentations are selected or modified based on accuracy or confidence information concerning locations and orientations.

19 Claims, 3 Drawing Sheets

AUGMENTATIONS BASED ON POSITIONING ACCURACY OR CONFIDENCE

CROSS-REFERENCE TO RELATED APPLICATIONS

This application claims the benefit of U.S. Provisional Patent Application No. 62/512,282, filed May 30, 2017, the complete contents of which are herein incorporated by reference.

FIELD OF THE INVENTION

The invention generally relates to virtual reality and augmented reality representations and, in particular, controlling representations based on accuracy or confidence measures of location and orientation information.

BACKGROUND

In augmented reality systems, augmentations are output to a user to alter their experience of a real world environment. Often an augmented reality (AR) system will superimpose images such as shapes or icons on top of a real world view captured by a camera or else seen directly through a see-through head mounted display (HMD).

Sports broadcasters frequently use augmented reality to represent information to viewers which is visible in the real world. For instance with American football, the broadcasting company frequently augments the recorded image of the real world view with the line of scrimmage and first down markers on the field. The line and markers do not exist in reality, but rather they are virtual augmentations that are added to the real world view. In order to accurately place the augmentations with respect to the real world view, the cameras and systems for recording the gameplay are set up with what may be referred to as "bore siting," which involves careful alignment of cameras with the playing field so the locations of both the camera and the field are known within a high degree of accuracy (high confidence). This helps ensure that the first down markers, for instance, are not shown 10 feet away from where they actually belong.

To "augment" the "reality" of the real world in a convincing and realistic manner, there should be some relationship between the augmentation and objects which are visible in the real world image. In general, an AR system must have some understanding of location of the AR system's camera and the objects within view of the camera in order to provide an augmentation to the user which has a meaningful relationship with the user's real world surroundings.

SUMMARY

If, for example, an AR system is configured to help users find a specific building and is displaying an augmentation intended to mark that building in a live video stream viewed by the user as he or she walks down the street, it is important to either exactly mark the correct building, or to otherwise indicate to the user that there is some uncertainty in the system's locationing accuracy. A system that merely takes its best guess and then marks the wrong building, with no indication to the user of a potential accuracy risk, could send the user unwittingly to the wrong location. The user would perhaps see an arrow augmentation, sized to be much smaller than the building itself, pointing at the center of the wrong building. Such is a type of problem or error addressed by exemplary embodiments of the invention.

According to an aspect of some exemplary embodiments, augmented reality augmentations are provided to a user in such a manner that they convey an accuracy or confidence measure of the location and/or orientation information which was used to determine the spatial relationship between the user and an object or the spatial relationship between two objects.

According to another aspect of some exemplary embodiments, accuracy or confidence measures of location and/or orientation information are conveyed to users via alternative appearances of virtual objects which related to the location and/or orientation information.

As an illustrative example, the aim of a particular augmented reality algorithm may be to display a label to a user which identifies a real world structure as matching a particular address or business name which may not itself be apparent from the building's exterior. The augmentation may generally take the appearance of a callout (e.g., a speech bubble) which, under ideal circumstances, points to or emanates from the front door of the building. To achieve this objective, an AR system or device must know with great accuracy and precision the location of the building, even more specifically the location of the front door, the user's location, and the user's orientation with respect to the building and front door. Is the user 10 feet from the door or 200 feet from the door? Is the user directly facing the door from across the street, or is the user behind the building looking in the direction of the front door but unable to see it because the building's walls obscure the user's view of the door? Is the door at the same elevation as the user or the building, or is it positioned up or down a flight of stairs and therefore at some different elevation? These and other positioning and orientation considerations all affect where the callout augmentation should be superimposed on the real world image. If the door is further away, perhaps the callout should be smaller. If the door is closer, perhaps the callout should be larger. If the door is to the left or the right of the real world image, then the bubble should also be more to the left or more to the right of the image, respectively. A problem, however, is that this level of accuracy or precision of location may not be available to the AR system. For instance, the location of the building may only be known within a margin of error of 10 meters. Or, it may be known that the door of the building is on the north facing wall, but it is unknown whether the door is at the left end of the north wall, the right end of the north wall, or somewhere in between, which may constitute a difference of few hundred meters or more depending on the size of the building.

An exemplary embodiment according to this disclosure attends to the problem described in the preceding paragraph by selecting or changing the augmentation (e.g., the appearance of the virtual object, in this case the callout) based on the extent of the accuracy and/or precision of the locations of the building, door, and user. For instance, if the building's location is only known within a margin of error of 100 meters, and as a result any of three different buildings might be the "right building" over which to superimpose the callout, the callout might be made large enough to stretch over all three buildings and point to none of them. Alternatively, the callout could point one of the three buildings and be color coded to signify to a user that the bubble may be as much as 100 meters off from the actual location it belongs. Alternatively, the bubble may be shown with deliberately poor sharpness (high blur) to signify to a user that the accuracy of its placement is in doubt or that its placement has a certain margin of error. On the other hand, the more accurate the known location of the building, the better the sharpness of the callout would be made by the AR device. A variety of different modifications or characteristics may be made to the augmentation or selected prior to the display or output of the augmentation depending on the accuracy or precision of object locations known to the AR device.

Characteristics of augmentations which may be selected or altered based on accuracy of positioning include but are not limited to blur/sharpness (e.g., fuzzier versus clearer lines), size/extent (e.g., bigger or smaller), color, and shape (e.g., point versus a cloud). Positioning accuracy may also or alternatively be conveyed by a base icon that does not necessarily change but which is accompanied (e.g., bracketed) by uncertainty indicators. For instance, a point of constant size may be bracketed by an uncertainty indicator that indicates positioning uncertainty based on the extent to which the indicator extends outward from the base icon. The extent to which the indicator extends outside the base icon indicates the area of uncertainty. For instance, a circle of variable size may be used for the indicator, the circle extending out around a point or dot of constant size.

A constellation of visualization may be provided for the same visual target (e.g., the building or door in the example of the preceding paragraph), and the node of the constellation is chosen or switched based on the real time changes of the estimated accuracy of positioning. In essence, each node corresponds with a different augmentation, and a different augmentation is output based on different accuracy measures. For visual augmentations, each node may correspond with a different graphical artifact.

Many exemplary embodiments concern visual augmentations, but auditory and tactile augmentations are also suited for the same principles discussed herein. Using the building and door example above, if the accuracy of building location is not well known, an auditory augmentation may be provided which explains "The building is near," whereas if the accuracy of the building location is well known, an auditory augmentation may be provided which explains "The building is directly in front of you."

DETAILED DESCRIPTION

Figure 1:
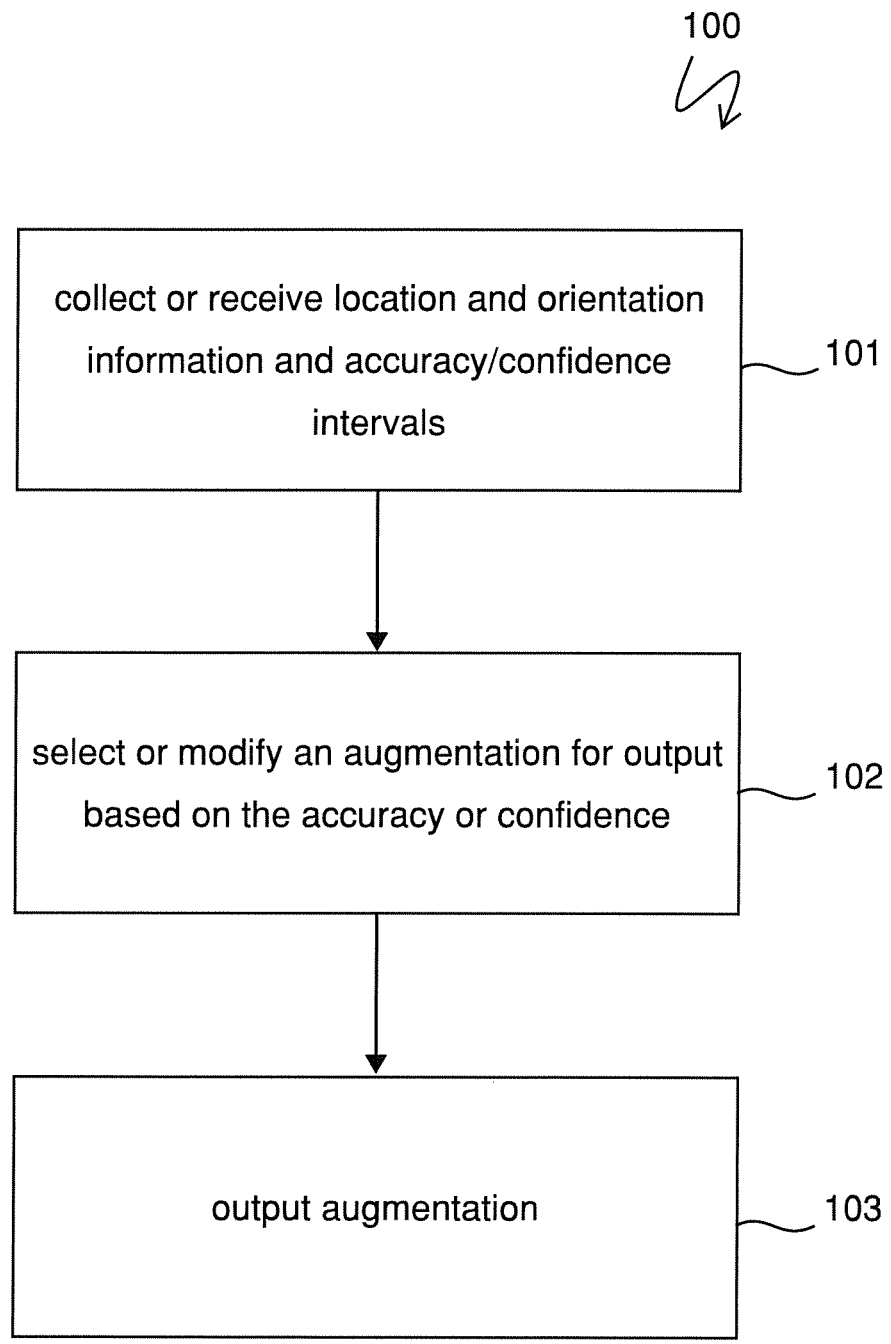
FIG. 1 is an exemplary method for providing an augmented reality.

Augmented reality involves defining spatial relationships between virtual objects and real objects, and then making the virtual objects apparent to a user of the augmented reality system in such a way as to combine real and virtual objects. For example, a visual augmented reality display could use virtual and real objects, and their defined spatial relationships, to generate a combined visual display in the form of a live streaming video (presenting real objects) overlaid with representations of the virtual objects. A spatial relationship between two objects (either or both of which may be virtual or real) may involve one or more of a topological relation, a distance relation, and a directional relation. A topological relation between an object A and an object B may be, for example, A is within B, A is touching B, A is crossing B, A is overlapping B, or A is adjacent to B. Precise spatial relationships between real and virtual objects allow an augmented reality system to generate perceptual experiences in which real and virtual objects are apparently combined seamlessly, e.g. for visual systems the combined presentation is apparently in the correct visual proportions, perspectives, and arrangement. Without correct reckoning of the spatial relationships in such a system, errors in the presentation of the system's output to the user can cause the system to be unusable, e.g. virtual objects appear out of place and therefore are not useful. An example is a virtual visual label that should label one building, but is erroneously shown overlaid onto a different building.

In order to create a visual augmented reality system, in addition to establishing spatial relationships between virtual objects and real objects, the visual perspective into the real world must be matched to the effective visual perspective into the virtual world. Even when the virtual world objects are sized and positioned correctly with respect to their real world counterparts, the determination of which virtual objects are eligible for visual presentation to the user depends on the perspective in the virtual world, which must be matched to the real world perspective of a real world camera in order to take advantage of carefully determined spatial relationships among virtual and real objects. For instance, it may be insufficient to know whether a man with an AR headset is two feet away from a building. It is also necessary to know whether the man is facing toward the building or, alternatively, facing away from the building. This involves knowing the orientation of the camera. The pose of a camera includes the position and orientation of the camera. The perspective of the camera includes the position of the camera, the orientation of the camera, and the field of view of the camera.

Location information for a camera or an AR device may be obtained, for example, from a GPS system co-located with the camera or AR device. An AR device may, for example, have a GPS unit built-in at the time of manufacturing. Location accuracy or confidence information may be obtained from the same source or sources as location information. Existing GPS units on the market provide, in addition to latitude, longitude, and altitude information, accuracy measures for each of these three measures. GPS units may give both a horizontal accuracy estimate and vertical accuracy estimate. The accuracy measures may be referred to by other names such as confidence estimates or margins of error. The actual value of the accuracy may depend on a number of circumstances which may include but are not limited to: the accuracy with which the camera is mounted with respect to the body of the AR device, and the accuracy of referential location information stored in a database. In some instances the accuracy may not be known in which case it may be estimated or assumed, in which case the selected augmentation is based on the estimated or assumed accuracy. Moreover, exemplary embodiments may be configured to accommodate many different kinds of confidence intervals. This is advantageous since not all devices (e.g., location or orientation sensors) necessarily represent accuracy, certainty, or confidence in the same way or form.

Orientation information may be obtained from sensors like a gyroscope and digital compass. These orientation devices, like GPS units or other location determining units, may be configured or configurable to provide accuracy or confidence measures in additional to their main outputs relating to orientation (e.g., direction). Orientation devices may also be co-located with a camera or built-in to the same overall device as the camera. For instance, a smartphone is a type of AR device that frequently includes one or more cameras, a GPS unit, a gyroscope, and a digital compass built in to the smartphone.

Processors of exemplary embodiments executing predetermined computer instructions are configured by the instructions to perform operations which control AR augmentations in dependence of the accuracy or confidences measures which are obtained or obtainable from location and orientation sensors (e.g., the GPS unit, gyroscope, digital compass, etc.). The objective fulfilled by the processors executing augmentation selection or alteration algorithms is to generate augmentations (as sensory output) that are selected or modified to convey accuracy information to a human user. An output of the processors is data that is ultimately used by an output device such as a display, speaker, and/or haptic device that outputs the selected or modified augmentation as visual, auditory, audiovisual, and/or tactile output.

While embodiments of the invention may improve the accuracy of determined location information by some method or subroutine, the central feature of displaying augmentations which reflect accuracy information stands apart from actually improving accuracy. Displaying augmentations which represent accuracy or confidence information has its own independent utility. Circumstances arise when accuracy simply cannot be improved or is not cost or time effective to be improved. Under these circumstances there is still an advantage to convey information to the user about the accuracy or confidence.

Referring now to FIG. 1, an exemplary method 100 is disclosed for providing an augmented reality. At block 101, location information is obtained for a camera. Field of view and orientation information for the camera may also be obtained at this step. Obtaining location or pose information may comprise receiving this information at a processor. The obtaining step may further include actually generating some pose information with sensors, such as a GPS sensor, gyroscope, and/or digital compass. The obtaining step may also include obtaining from one or more databases location information describing the locations of real world objects and/or virtual objects, at least some which correspond with available augmentations. At block 101, accuracy or confidence information for the pose and location information is also obtained. Accuracy or confidence intervals may be obtained by a processor from location or orientation sensors. Accuracy or confidence intervals may also or alternatively be computed by the processor. At block 102, the processor selects or modifies an augmentation for output based on the accuracy or confidence of the orientation and/or location information. For example, blur of an augmentation may be selected based on a confidence interval (a high confidence results in the selection of a comparatively sharp augmentation image, and a low confidence results in the selection of a comparatively blurry augmentation image). At block 103, the augmentation is output with an augmented reality output device.

Figure 2:
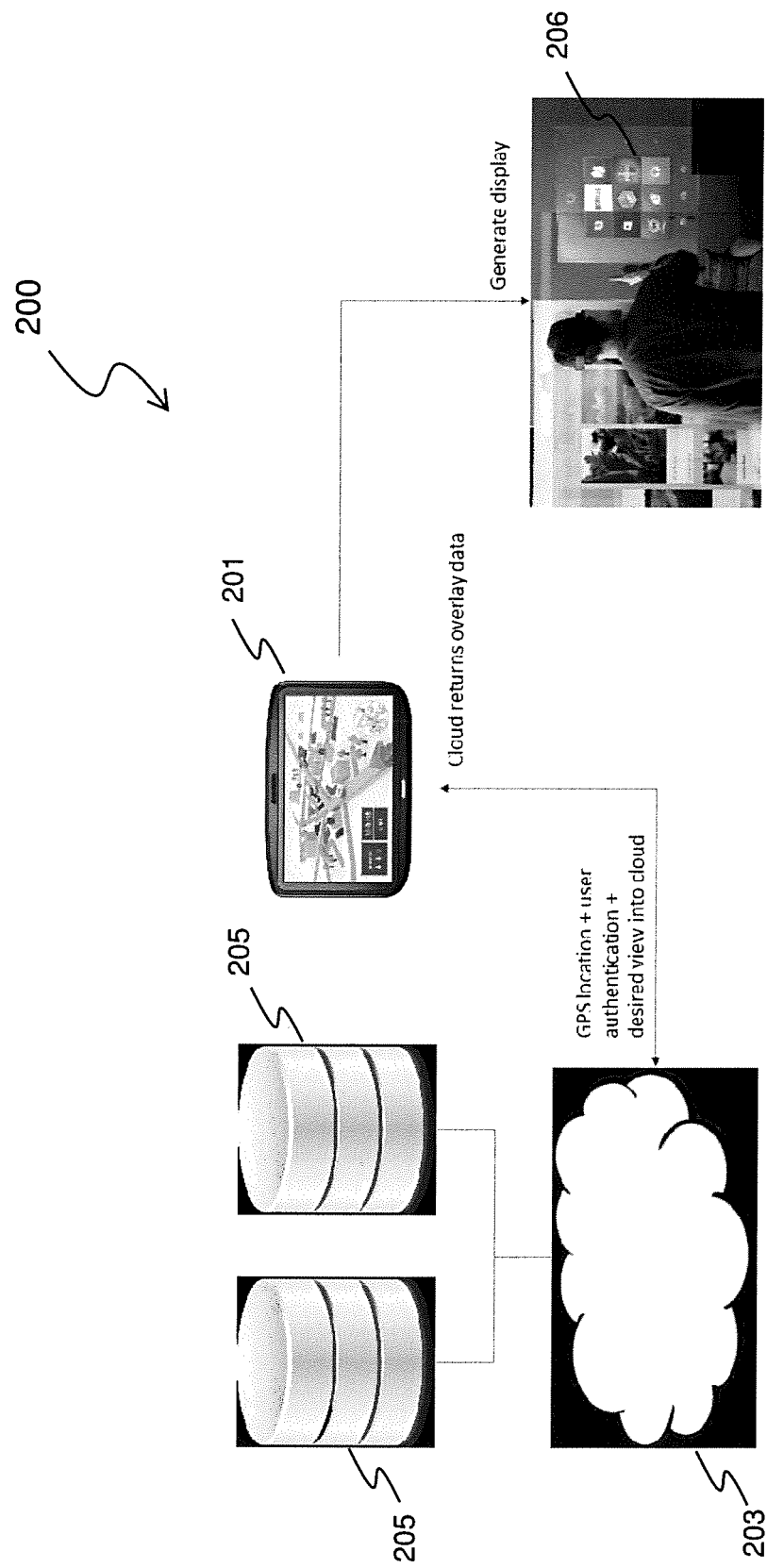
FIG. 2 is an exemplary system for providing an augmented reality.

FIG. 2 is a diagram of an exemplary system 200 for performing the method 100 of FIG. 1. The system 200 comprises an AR device 201 (e.g., a smartphone, tablet, special purpose AR headset, etc.) that includes one or more cameras to capture images or videos. The AR device 201 may be connected over a network to databases 205 comprising location and orientation accuracy information. Cloud computing devices 203 such as remote processors (e.g., server processors) may receive the images/videos and the location information from the device 201 along with location and accuracy information from databases 205. The processors then apply selection and/or modification filters to available augmentations based on the accuracy information to determine what augmentations to present to a user. Augmentation (e.g., overlay) data is returned to the device 201 which then generates a display 206 with the augmentations. The augmentations may be one or more of the following: audio, visual, and/or tactile augmentation outputs. Processors of the device 201 may also or alternatively perform the data processing for determining the augmentations for output.

Figure 3A:
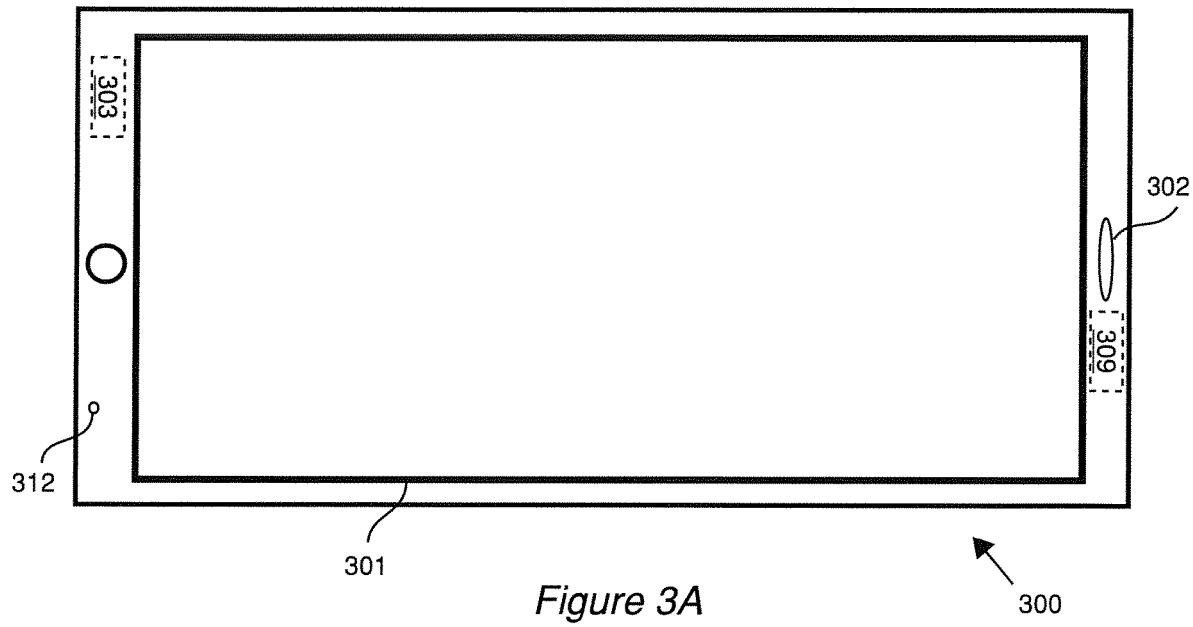
FIGS. 3A and 3B show an exemplary augmented reality device.
Figure 3B:
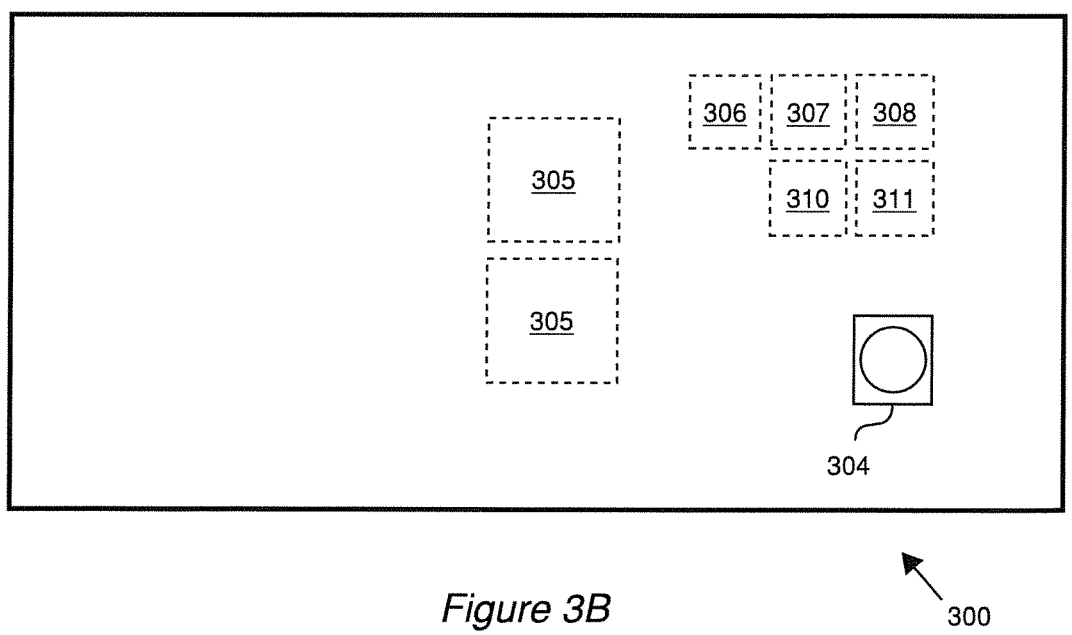

FIGS. 3A and 3B shows opposite sides of an exemplary AR device 300. FIG. 3A shows the device 300 (e.g., a mobile phone) with a display 301 (e.g., a screen). The electronic device 300 includes a speaker 302 and a haptic device 303 as additional output devices besides the display 301. The display 301, speaker 302, and haptic device 303 are all accurately regarded as "output devices", as is the entire electronic device 300 by virtue of the display, speaker, and haptic device being integral therewith. The electronic device 300 comprises or is connected with additional sensors such as an accelerometer 306, gyroscope 307, magnetic field sensor or magnetometer 308, proximity sensor 309, barometer 310, thermometer 311, and microphone 312. The sensors collect the respective data of their respective types (e.g., magnetometer collects magnetic field data or compass data).

Images or videos of a real world view of a geographic space are captured using one or more cameras. FIG. 3B shows a camera 304 on the rear side of the electronic device 300. As used herein, "camera" is a device capable of capturing and characterizing incident electromagnetic radiation (i.e., "light") so as to recreate a visual image as a photograph or a series of images forming a film or video. Cameras of some embodiments capture only the visible spectrum (i.e., what humans see naturally). While general consumer cameras concern only the visual spectrum detectable by the unaided human eye, other embodiments of the invention may use one or more cameras which are capable of capturing wavelengths of light which are not visible to unaided human eyes, for instance infrared or ultraviolet light. The image (or images) captured by the camera is characterized by data that describes both contents of the image (e.g., colors, pixels, etc.) and aspects of the image's capture. The capture of an image is characterizable with pose (which includes both position and orientation) and field of view.

A real world image may include (e.g., if from a city's street intersection camera for instance) HUD displays of date and time, or even could have augmentations in it from another augmented reality system that is providing video to a system based on the present disclosure. In general an augmented reality system need only have some portion of its input that is real. In some embodiments this may be a relatively small portion. Augmented reality systems may be used to modify the augmentations of other augmented reality systems in more complex applications, e.g., a system comprises distributed independent augmentation engines which make use of each other's output.

The data from the camera(s) 304 and collected by the other sensors (e.g., 306, 307, 308, 309, 310, and/or 311) is received by one or more processors 305. The camera data describes images or videos of a real world view of the geographic space in the vicinity of the camera and, in some but not necessarily all embodiments, in the vicinity of the operator of the camera. In this example, the camera 304 and the display 301 are part of the same unitary electronic device 300, and the geographic space is also in the vicinity of the output device, display 301. The camera 304 and the electronic device 300 that includes the camera 304 may be regarded as the viewing device. Viewing devices may include various types (but not necessarily all types) of cameras, mobile electronic devices, mobile phones, tablets, portable computers, wearable technology, and the like. If the electronic device 300 were a head-mounted display (HMD), the HMD would be characterizable as a viewing device, too. A HMD that has no cameras, such as some see-through HMDs, may still qualify as a viewing device. A lens or pair of lenses of the see-through head-mounted display also qualifies as a viewing device.

The one or more processors 305 are configured to process the data from the one or more cameras 304, as well as other data like data from sensors 306, 307, 308, 309, 310, and/or 311, in order to generate an output useable by an output device to present an augmented reality to a user. In some embodiments, the image and/or sensor data from the cameras/sensors is sent over a network (e.g., the Internet) to one or more remote servers comprising some of one or more processors that perform processing of the data before augmentations are provided to an output device for outputting to a user. Such a networked implementation was shown in FIG. 2.

An exemplary implementation of the invention may be in the context of safety systems. An AR system according to some exemplary embodiments may be configured to warn users about dangerous areas where they should not walk or travel, e.g., construction, sinkholes, rockslides, avalanches, and so on, by displaying augmentations within a live video stream displayed on a mobile device. An augmentation for this purpose may be, for example, a partly transparent color overlay that marks (e.g., by color such as red) the areas on the ground that are dangerous. Users may check at will for dangerous areas simply by looking at the AR application on their mobile devices and avoiding the problem areas, e.g., walking around them. A perfectly accurate system would simply mark the precise outlines of the danger areas. However, if in some situations the determination of the pose or field of view of the AR user becomes less certain, for safety reasons the augmentation boundary may be expanded, so that the user would be in no danger even accounting for reduced location accuracy.

Another exemplary implementation provides improvements over indoor AR systems such as the Microsoft HoloLens. Devices such as the HoloLens do not use GPS nor compass information, but instead uses multiple cameras and motion sensors to build an internal model of the indoor environment. The HoloLens then places augmentations into the internal model for display to the user via a head mounted display. The HoloLens and similar devices may be used for a variety of purposes, recreational/consumer as well as work/professional. According to an exemplary embodiment of the invention, a physical device like the HoloLens may be configured with an AR software application that indicates the presence of water pipes or electric power lines within walls, e.g., by marking the route of those pipes or wires as an augmented reality line running along the wall. According to the exemplary embodiment, the output of the AR device changes based on the certainty/uncertainty of the positions of structures inside of the walls. For example, when the HoloLens or other indoor AR device is relatively uncertain of its position, it may accordingly change the rendering of the augmentation. For example, the augmentation may primarily consist of a solid line, but the line may be rendered with increasing amounts of blur when positioning information is judged to be less accurate. Conversely, with comparatively high positioning accuracy, the line may be rendered with comparatively greater sharpness or clarity.

Location information may be absolute (e.g., latitude, longitude, elevation, and a geodetic datum together may provide an absolute geo-coded position requiring no additional information in order to identify the location), relative (e.g., "2 blocks north of latitude 30.39, longitude −97.71 provides position information relative to a separately known absolute location), or associative (e.g., "right next to the copy machine" provides location information if one already knows where the copy machine is; the location of the designated reference, in this case the copy machine, may itself be absolute, relative, or associative). Absolute location involving latitude and longitude may be assumed to include a standardized geodetic datum such as WGS84, the World Geodetic System 1984. In the United States and elsewhere the geodetic datum is frequently ignored when discussing latitude and longitude because the Global Positioning System (GPS) uses WGS84, and expressions of latitude and longitude may be inherently assumed to involve this particular geodetic datum. For the present disclosure, absolute location information may use any suitable geodetic datum, WGS84 or alternatives thereto.

It should be appreciated that "processor" is used herein in the singular for easy and clarity of discussion. However, description of a step or method performed by "a processor" does not preclude one or more processors from being involved in performing the described step or method. That is to say, "a processor" may operate independently or it may operate with one or more additional processors to execute described functionality. One or more processors may be located at different geographic places and networked together over the Internet, for example.

While the invention has been described herein in connection with exemplary embodiments and features, one skilled in the art will recognize that the invention is not limited by the disclosure and that various changes and modifications may be made without departing from the scope of the invention as defined by the appended claims.

What is claimed is:

1. A method of providing an augmented reality, comprising
    obtaining location and orientation information for a camera;
    obtaining first accuracy or confidence information for the location and orientation information of the camera;
    selecting or modifying an augmentation for output based on (i) the obtained first accuracy or confidence information for the location and orientation of the camera and (ii) second accuracy information sourced from a database which characterizes spatial relationships between virtual world objects of available augmentations and their real world counterparts; and
    outputting the augmentation with an augmented reality output device.

2. The method of claim 1, wherein the step of selecting or modifying comprises selecting and modifying one or more of blur/sharpness, size/extent, color, and shape.

3. The method of claim 2, wherein the step of selecting or modifying comprises selecting a blurriness or sharpness of an augmentation based on the accuracy or confidence.

4. The method of claim 1, wherein the step of selecting or modifying comprises changing an uncertainty indicator that accompanies an unchanging base icon.

5. The method of claim 1, wherein the step of outputting comprises outputting at least one augmentation that is one or more of audial, visual, and tactile.

6. The method of claim 1, wherein the step of selecting or modifying outputs an augmentation which is a boundary, and wherein the step of selecting or modifying comprises expanding the boundary to account for a reduction in location accuracy.

7. The method of claim 1, wherein the step of selecting or modifying is based on the certainty or uncertainty of the positions of structures inside of walls.

8. The method of claim 1, wherein the first and second obtaining steps and the selecting or modifying step are performed at least in part by one or more processors.

9. The method of claim 8, wherein at least one of the first and second obtaining steps is performed at least in part by one or more of a GPS unit, gyroscope, accelerometer, digital compass, and magnetometer.

10. The method of claim 1, wherein the augmented reality output device performing the outputting step is or comprises one or more of a display, speaker, haptic device, smartphone, tablet, and special purpose AR headset.

11. An augmented reality (AR) system, comprising
a camera configured to capture images or videos;
one or more processors configured to execute computer readable instructions which cause the one or more processors to perform
obtaining location and orientation information for the camera,
obtaining first accuracy or confidence information for the location and orientation information of the camera, and
selecting or modifying an augmentation for output based on (i) the obtained accuracy or confidence for the location and orientation of the camera and (ii) second accuracy information sourced from a database which characterizes spatial relationships between virtual world objects of available augmentations and their real world counterparts; and
an output device for outputting the augmentation selected or modified by the one or more processors.

12. The AR system of claim 11, wherein the step of selecting or modifying comprises selecting and modifying one or more of blur/sharpness, size/extent, color, and shape.

13. The AR system of claim 12, wherein the step of selecting or modifying comprises selecting a blurriness or sharpness of an augmentation based on the accuracy or confidence.

14. The AR system of claim 11, wherein the step of selecting or modifying comprises changing an uncertainty indicator that accompanies an unchanging base icon.

15. The AR system of claim 11, wherein the output device is configured to output at least one augmentation that is one or more of audial, visual, and tactile.

16. The AR system of claim 11, wherein the output device is configured to output an augmentation which is a boundary, and wherein the step of selecting or modifying comprises expanding the boundary to account for a reduction in location accuracy.

17. The AR system of claim 11, wherein the step of selecting or modifying is based on the certainty or uncertainty of the positions of structures inside of walls.

18. The AR system of claim 11, further comprising one or more of a GPS unit, gyroscope, accelerometer, digital compass, and magnetometer configured to assist the one or more processors in performing the first and second obtaining steps.

19. The AR system of claim 11, wherein the output device is or comprises one or more of a display, speaker, haptic device, smartphone, tablet, and special purpose AR headset.

* * * * *